(12) United States Patent
Davis

(10) Patent No.: US 6,209,576 B1
(45) Date of Patent: Apr. 3, 2001

(54) AUTOMATIC FLUID FLOW SHUT-OFF DEVICE

(76) Inventor: Dan Davis, 1111 NW. 4th Ave., Delray Beach, FL (US) 33444

(*) Notice: Subject to any disclaimer, the term of this patent is extended or adjusted under 35 U.S.C. 154(b) by 0 days.

(21) Appl. No.: 09/368,668

(22) Filed: Aug. 5, 1999

(51) Int. Cl.$^7$ ................................ F16K 17/00; E03B 7/04
(52) U.S. Cl. ....................... 137/487.5; 137/460; 137/486; 137/624.11
(58) Field of Search .......................... 137/624.11, 487.5, 137/460, 486

(56) References Cited

U.S. PATENT DOCUMENTS

| | | | |
|---|---|---|---|
| 4,797,820 | * | 1/1989 | Wilson et al. ............... 137/624.13 |
| 4,858,827 | * | 8/1989 | Fletcher et al. .............. 137/624.18 |
| 5,135,168 | * | 8/1992 | Wang ........................... 137/624.18 |
| 5,287,884 | * | 2/1994 | Cohen ............................... 137/486 |
| 5,331,619 | * | 7/1994 | Barnum et al. ............... 137/624.11 |
| 5,568,825 | * | 10/1996 | Faulk .......................... 137/624.11 |
| 5,771,920 | * | 6/1998 | Jewett et al. .................. 137/487.5 |
| 5,782,263 | * | 7/1998 | Isaacson, Jr. et al. .......... 137/487.5 |
| 5,944,052 | * | 8/1999 | Rashidi ........................ 137/624.18 |

* cited by examiner

Primary Examiner—Gregory L. Huson
Assistant Examiner—Ramesh Krishnamurthy
(74) Attorney, Agent, or Firm—Robert M. Downey, P.A.

(57) ABSTRACT

An automatic fluid shut-off device for interrupting fluid flow through a fluid supply path in a fluid delivery system. The automatic fluid shut-off device includes: a fluid flow sensor structured and disposed for monitoring fluid flow in a fluid supply path; a control panel housing, a central processing unit, and including a visual display panel, programming buttons, and indicator lights; and either a solenoid actuated fluid shut-off valve or relay that interrupts power to a fluid pump. The fluid flow sensor monitors fluid flow in the fluid supply path and outputs the fluid flow data to the central processing unit. The central processing unit compares the measured fluid flow value with the value preprogrammed for the particular operating conditions or for the particular active zone in a multi-zone fluid delivery system. The central processing unit actuates the solenoid to close the shut-off valve and/or trigger the relay to an open position to thereby stop fluid flow through the system when the measured fluid flow value exceeds the applicable preprogrammed maximum value. An audible alarm tone and flashing light are also triggered when the measured fluid flow value exceeds the maximum value. User inputs are provided for inputting maximum fluid flow values and for selecting particular operating modes for the system.

14 Claims, 7 Drawing Sheets

AUTOMATIC FLUID FLOW SHUT-OFF DEVICE

BACKGROUND OF THE INVENTION

1. Field of the Invention

The present invention relates to automatic fluid shut-off devices for stopping fluid flow through a fluid delivery system upon detection of a fluid flow value which exceeds a predetermined value. More particularly, the present invention relates to an automatic fluid shut-off device comprising of a fluid flow sensor, a central processing unit, and means for interrupting fluid flow wherein fluid flow data is monitored by a programmable central processing unit that compares measured fluid flow values to one or more programmed values and actuates a fluid flow interruption means if said measured fluid flow value exceeds the one or more programmed values. The central processing unit also compensates for changing fluid flow requirements in both single zone and multi-zone fluid delivery systems.

2. Description of the Related Art

The use of fluid control and fluid shutoff devices of various designs and configurations are known in the prior art. Such fluid control devices are used for terminating fluid flow when specific parameters are not met through various methods and apparatuses. In U.S. Pat. No. 5,539,384, there is disclosed an apparatus for use on a water line wherein a water shutoff valve is actuated and an alarm sounds when the water pressure in the water line is measured to be outside of specified parameters. U.S. Pat. No. 5,764,148 discloses a device for coupling to a conventional computer and therein storing water flow rate and calculating water consumption. U.S. Pat. No. 5,709,239 discloses an automatic fluid shutoff device that terminates fluid flow if there is abnormal fluid flow. In U.S. Pat. No. 4,880,030, there is disclosed a device to cut off water supply if there is an overly high water consumption due to a leak or break in the plumbing of a house. U.S. Pat. No. 4,353,118 discloses an apparatus for measuring fluid through flow in a fluid supply conduit.

The devices described above do not allow the user to preset a plurality of fluid flow operating parameters to conveniently establish and select the appropriate fluid flow shutoff settings according to varying water consumption needs. Furthermore, the prior art does not disclose a device for use in multi-zone fluid delivery systems wherein fluid flow is terminated only to malfunctioning zones, leaving zones that are operating under specified parameters unaffected.

Accordingly, there is an obvious need in this area for an automatic fluid shutoff device providing a variety of operating modes that correlate with specific fluid flow requirements. For example, allowing a homeowner to set the fluid shutoff device in a mode where no fluid flow is allowed when the dwelling is uninhabited for an extended period of time, such as when the homeowner is gone on vacation, and then change to an operating mode commensurate with fluid flow requirements for habitation when the homeowner returns.

There is a further need for an automatic fluid shutoff device for use in multi-zone fluid delivery systems wherein fluid flow is terminated to a zone that has a broken pipe or sprinkler, but wherein the fluid shutoff device resets itself to facilitate fluid flow when the next zone is activated.

SUMMARY OF THE INVENTION

The present invention relates to an automatic fluid shutoff device for interrupting fluid flow through a fluid supply path in a fluid delivery system. The present invention comprises a fluid flow sensor structured and disposed for monitoring fluid flow through the fluid supply path and for measuring fluid flow values associated with the fluid flow, means for terminating fluid flow through the fluid supply path, and a central processing unit that is housed in a control panel.

The fluid flow sensor outputs data correlating to the measured fluid flow values. The central processing unit communicates with the fluid flow sensor and the means for terminating fluid flow. When a measured fluid flow value exceeds predetermined maximum fluid flow value stored in the central processing unit, the central processing unit activates the means for terminating fluid flow through the fluid supply path and activates an audible alarm tone as well as a flashing trouble light. The alarm tone and flashing light continue until a stop button is depressed. For a municipal supplied fluid delivery system the preferred means for terminating fluid flow is a solenoid actuated shutoff valve. For a well fed fluid delivery system, the preferred means for terminating fluid flow is to interrupt power to the fluid supply pump.

The present invention has user inputs for establishing maximum fluid flow values and user inputs for setting the operating mode for the automatic fluid shutoff device. When used on a water supply line feeding a household or facility, the operating modes are "stay" for normal operation, "away" to allow zero or minimal fluid flow, "stop" to terminate all fluid flow, and "bypass" to bypass the alarm tone, trouble light, and means for terminating fluid flow.

When used on a multi-zone fluid delivery system, such as an irrigation system, the present invention stores maximum fluid flow values for each zone in the irrigation system. When cycling through zones, fluid flow is terminated to a zone that has a broken pipe or sprinkler, but after completion of that zone's cycle, the fluid shutoff device resets itself to facilitate fluid flow when the next zone is activated.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figure 1:
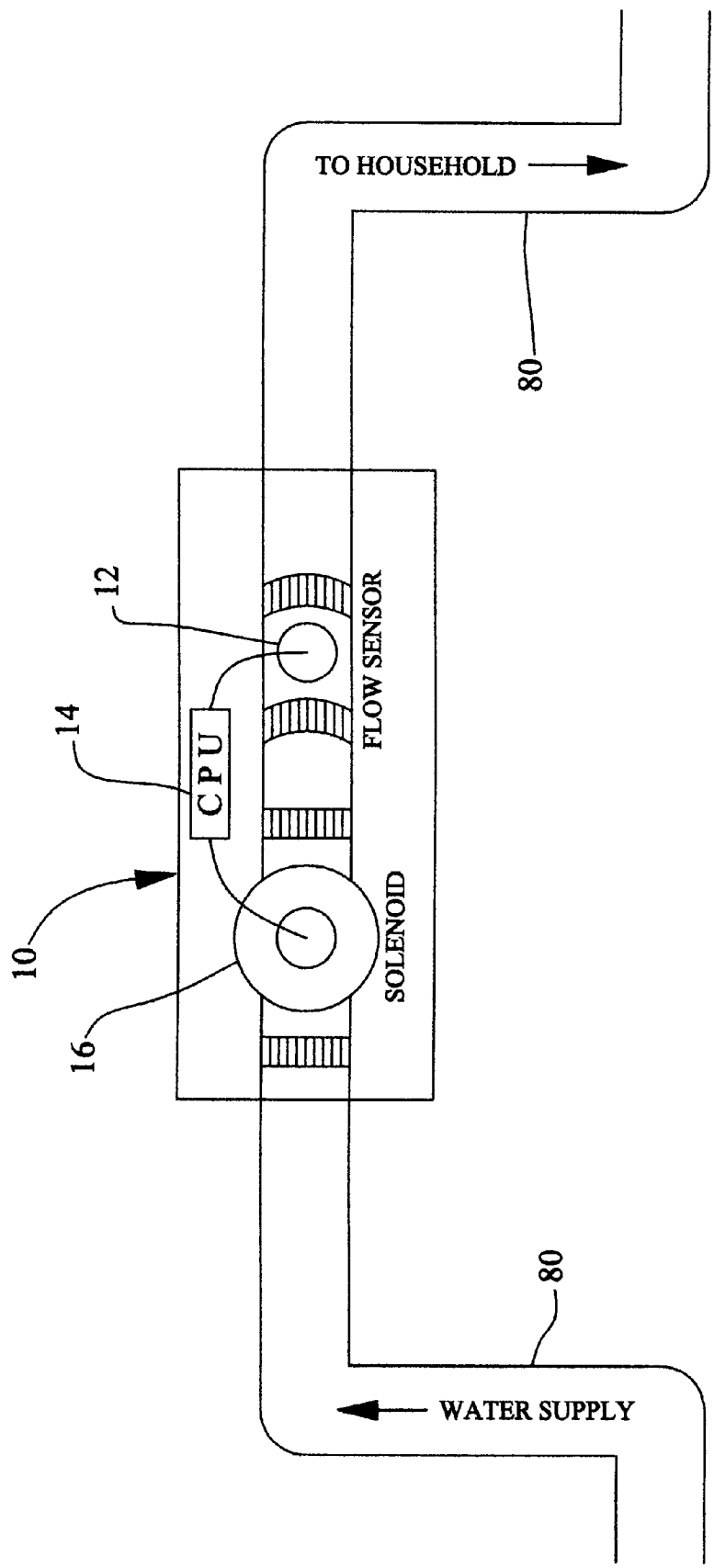
FIG. 1 is a component diagram of the preferred embodiment of the present invention for use in a single zone fluid delivery system.
Figure 4:
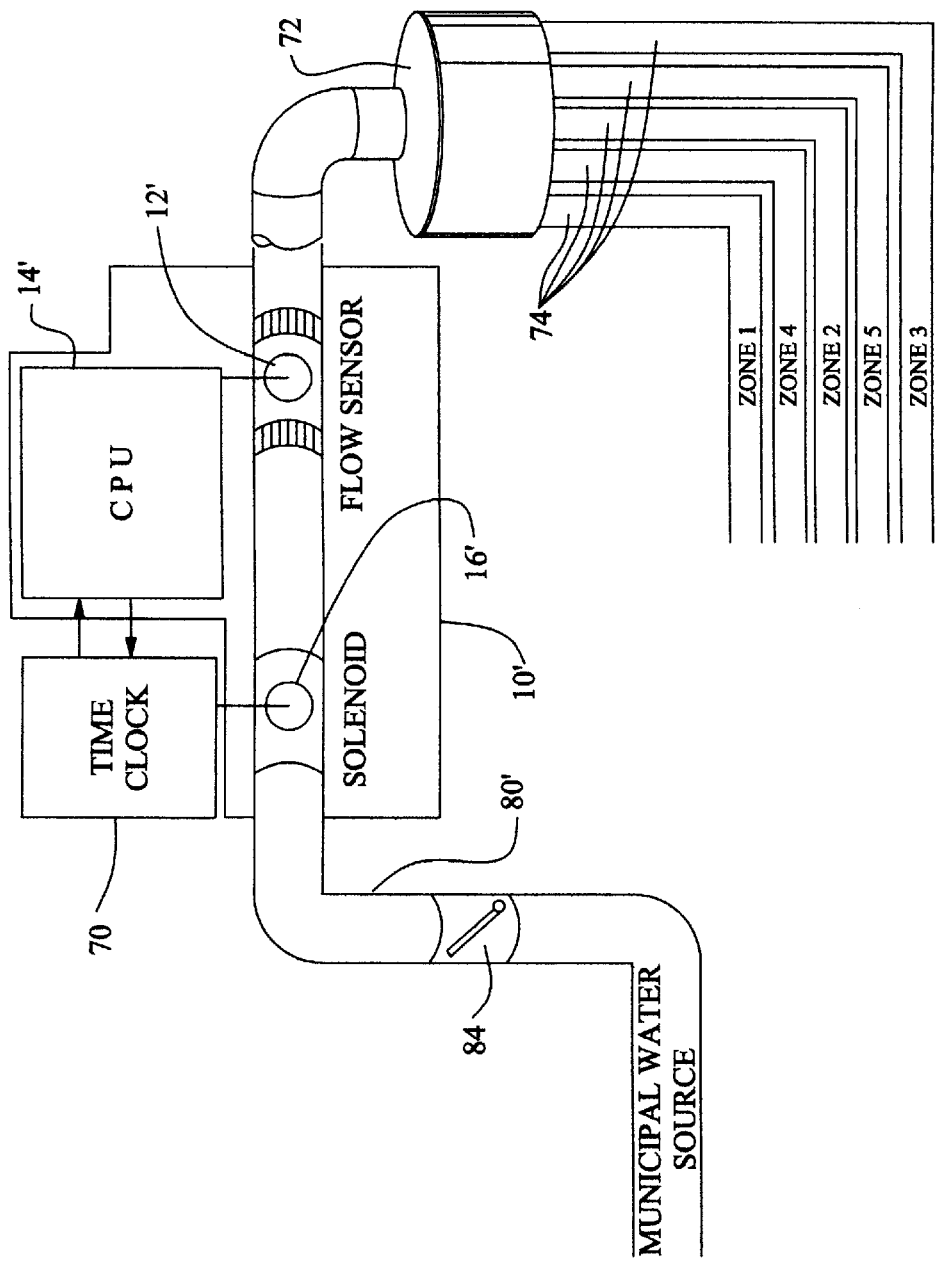
FIG. 4 is a component diagram of the preferred embodiment of the present invention for us in a multi-zone fluid delivery system.
Figure 5:
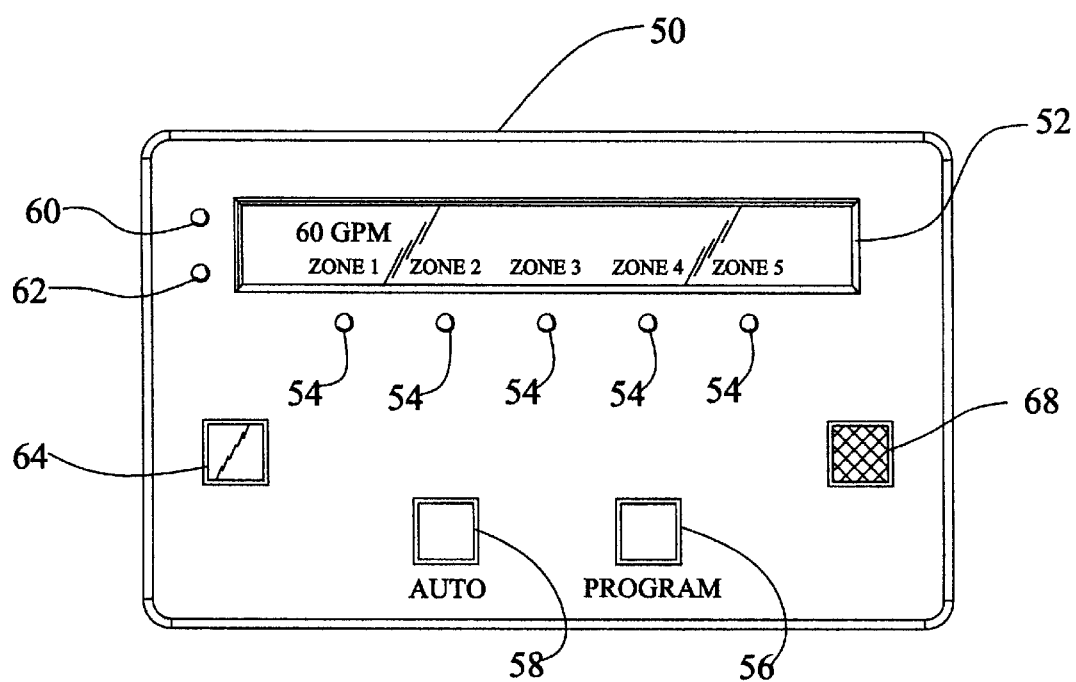
FIG. 5 is a front view of the control housing, a component of the present invention for use in a multi-zone fluid delivery system.

Referring to FIGS. 1 and 4, the present invention is directed to an automatic fluid shut-off device, generally indicated as 10, for interrupting fluid flow through the fluid supply path 80. The present invention comprises a fluid flow sensor 12 structured and disposed for monitoring fluid flow through the fluid supply path 80 and for measuring fluid flow values associated with the fluid flow. The fluid flow sensor also outputs data correlating to the measured fluid flow values. The present invention further includes means for terminating fluid flow through the fluid supply path.

The present invention also comprises a central processing unit 14 which communicates with the fluid flow sensor 12 and the solenoid actuated fluid shut-off valve 16. The central processing unit 14 monitors output data from the fluid flow sensor 12. When the output data shows that the measured fluid flow value exceeds a predetermined maximum fluid flow value stored in the central processing unit 14 the central processing unit then communicates with the shut-off valve 16 to terminate fluid flow through the supply path 80. Means are provided for programming the predetermined maximum fluid flow values into the central processing unit 14.

It is anticipated that the automatic fluid shut-off device 10 may be used in the main water supply line feeding a household or facility, used with a single zone irrigation system, or used with a multi-zone irrigation system. Therefore, the central processing unit 14 may be structured and disposed for monitoring fluid flow values in a single zone fluid supply system as shown in FIG. 1 or for monitoring fluid flow values in a multi-zone system, as shown in FIG. 4.

Figure 7:
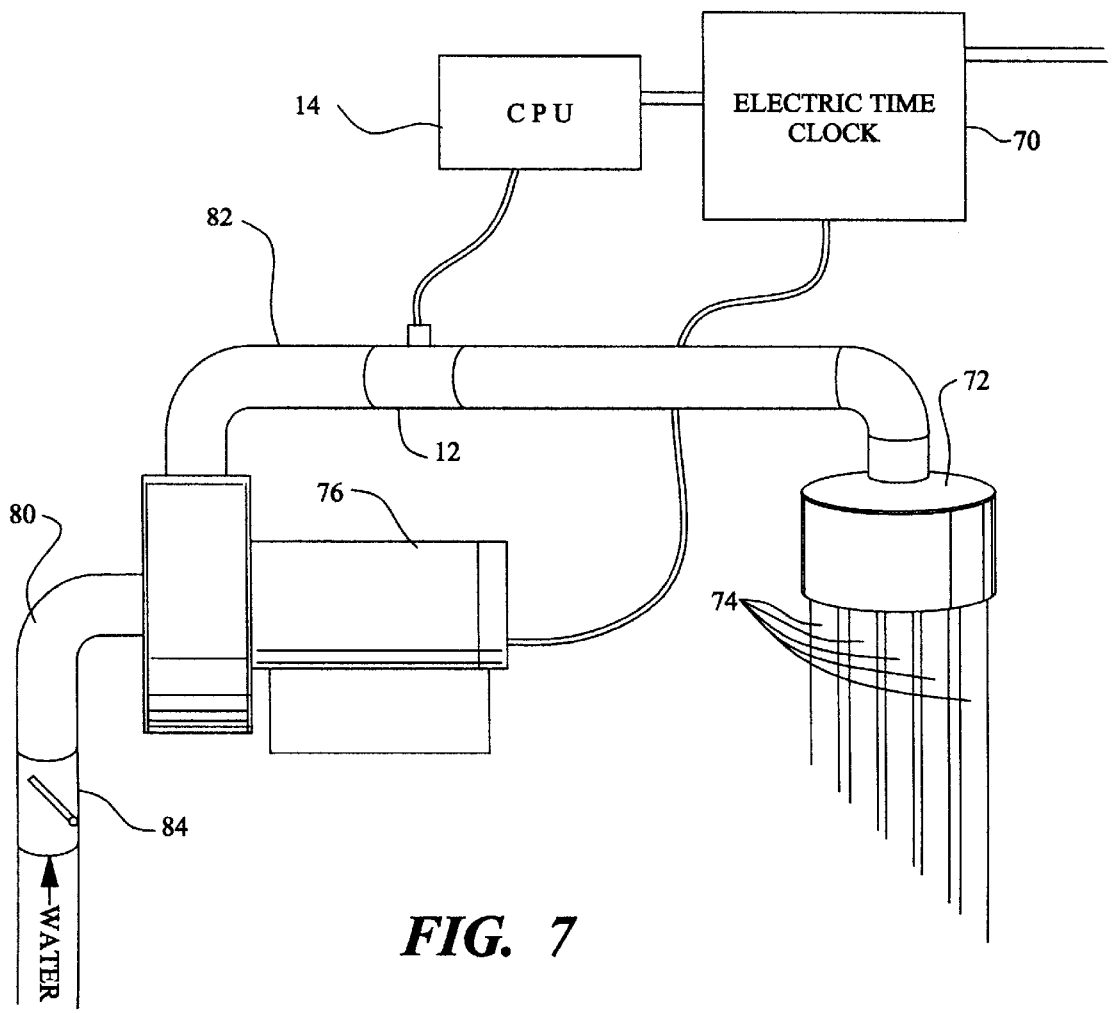
FIG. 7 is a diagram of the preferred embodiment of the present invention for use in a multi-zone fluid delivery system utilizing a fluid pump.

In the multi-zone fluid supply system, predetermined maximum fluid flow values may be programmed into the central processing unit 14 for each individual zone. For fluid supply systems utilizing a pump to supply fluid from a private well, as shown in FIG. 7, means may be provided to interrupt power to the fluid supply pump to thereby interrupt fluid flow when the measured fluid flow value exceeds a predetermined fluid flow value.

Referring to FIG. 1, the preferred embodiment of an automatic fluid shut-off device for use in the single zone fluid delivery system is shown and generally referred to as 10. The automatic fluid shut-off device 10 comprises a fluid flow sensor 12 structured and disposed for monitoring fluid flow through the fluid supply path 80 and for measuring a volume of fluid flow. The fluid flow sensor 12 is structured for outputting data correlating to fluid flow volume. Means are provided for terminating fluid flow through the fluid supply path 80. One such means for terminating the fluid flow comprises a solenoid actuated fluid shut-off valve 16 positioned along the fluid supply path 80 and being operable between a normally opened position to facilitate fluid flow through the fluid supply path and a closed position to interrupt the fluid flow through the fluid supply path. Referring to FIG. 7, an alternate embodiment for terminating fluid flow through the fluid supply path 80 is shown, wherein means are provided for interrupting power to a fluid pump 76 in the fluid delivery system.

The automatic fluid shut-off device further comprises a central processing unit 14 for communicating with the fluid flow sensor 12 and the shut-off valve 16 or means for interrupting power to the fluid pump 76. The central processing unit 14 receives measured fluid flow volume output data from the fluid flow sensor 12 which the central processing unit translates to fluid flow volume data. The central processing unit 14 also receives input data including data establishing at least one maximum fluid flow volume and has memory for storing the input data. Furthermore, the central processing unit 14 detects initiation and subsequent termination of fluid flow through the fluid supply path 80 to thereby define a flow cycle.

The central processing unit 14 evaluates and compares the measured fluid flow volume data for each flow cycle with the maximum fluid flow volume data stored in the central processing unit's memory in order to identify an alarm condition when the measured fluid flow volume during a flow cycle exceeds the maximum fluid flow volume that is stored in memory. When an alarm condition is identified by the central processing unit 14, the central processing unit triggers actuation of the means for terminating fluid flow through the fluid supply path, therein shutting off fluid flow through the fluid supply path 80.

The central processing unit 14 also detects initiation of a change in fluid flow volume prior to the completion of a flow cycle. When such a change occurs, the central processing unit redefines the flow cycle as beginning commensurate with the change in fluid flow volume and the fluid flow volume measurement is re-initiated to a value of zero. The fluid flow volume subsequent to the fluid flow volume change is then monitored.

Figure 2:
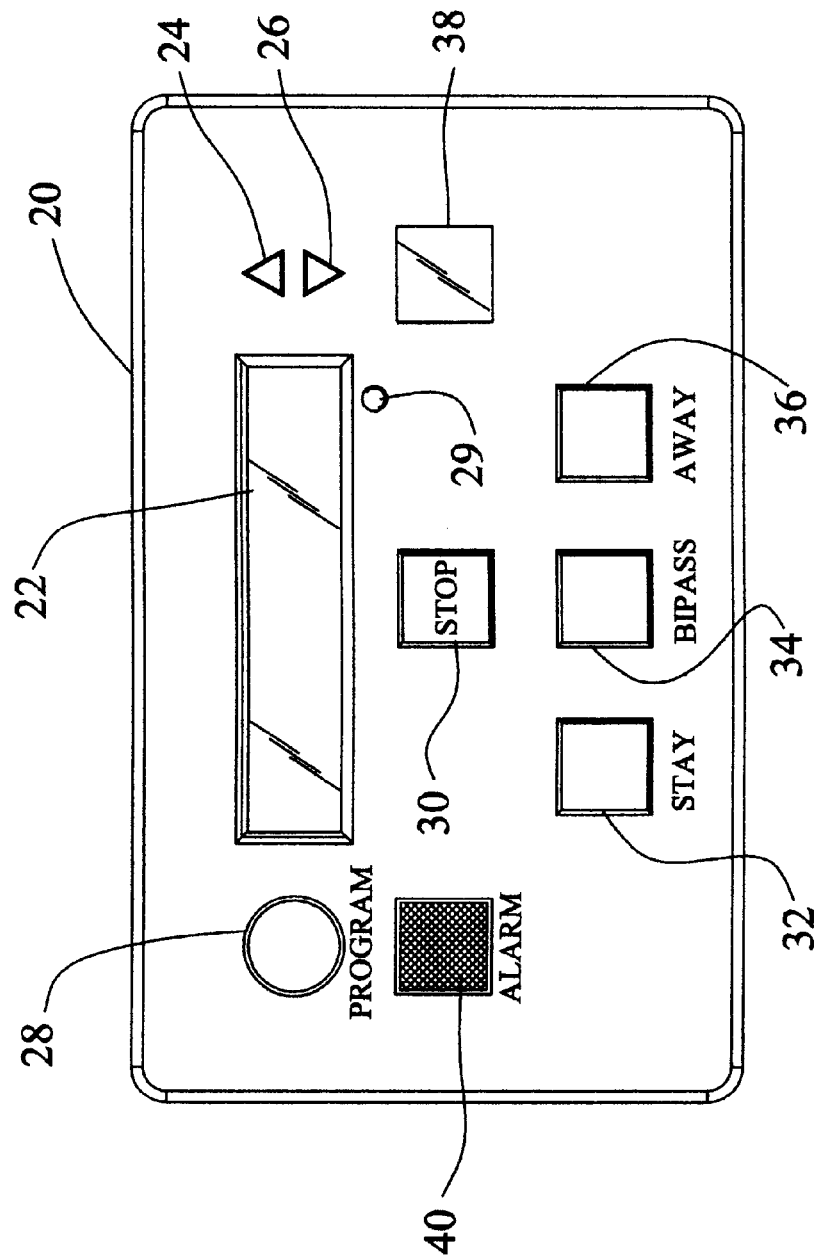
FIG. 2 is a front view of the control housing, a component of the present invention, for use in a single zone fluid delivery system.

The central processing unit 14 is housed in a control panel 20 as shown in FIG. 2. The control panel 20 is structured and disposed to house and electronically communicate with the central processing unit 14. The control housing 20 comprises a visual display panel 22, an audio transducer 40 structured and disposed to transmit an audible alarm tone when the alarm condition is triggered, a trouble light 38 structured and disposed to flash when the alarm condition is triggered, gallon selection buttons 24, 26, a program button 28, a trip switch 29 for gallon tabulation, a stop button 30, a stay button 32, a bypass button 34, and an away button 36. When an alarm condition is triggered, the audio transducer 40 emits an audible alarm tone and the trouble light 38 flashes. The alarm tone and flashing light continue until the stop button 30 is depressed.

There are two gallon selection buttons. The first gallon selection button 24 increments gallons of fluid displayed on the visual display panel 22. The second gallon selection button 26 decrements the gallons displayed on the visual display panel 22. Using the gallon selection buttons, a user may select up or down to reach the appropriate maximum fluid flow volume allowable when the automatic fluid shut-off device is in the stay mode. Once the desired maximum gallons of flow volume is displayed on the visual display panel 22, the program button 28 is depressed to store this value into the central processing unit 14 establishing the maximum fluid flow volume data. When the measured fluid flow volume for a flow cycle exceeds the maximum fluid flow volume programmed into the central processing unit 14, the alarm condition is triggered.

Figure 3:
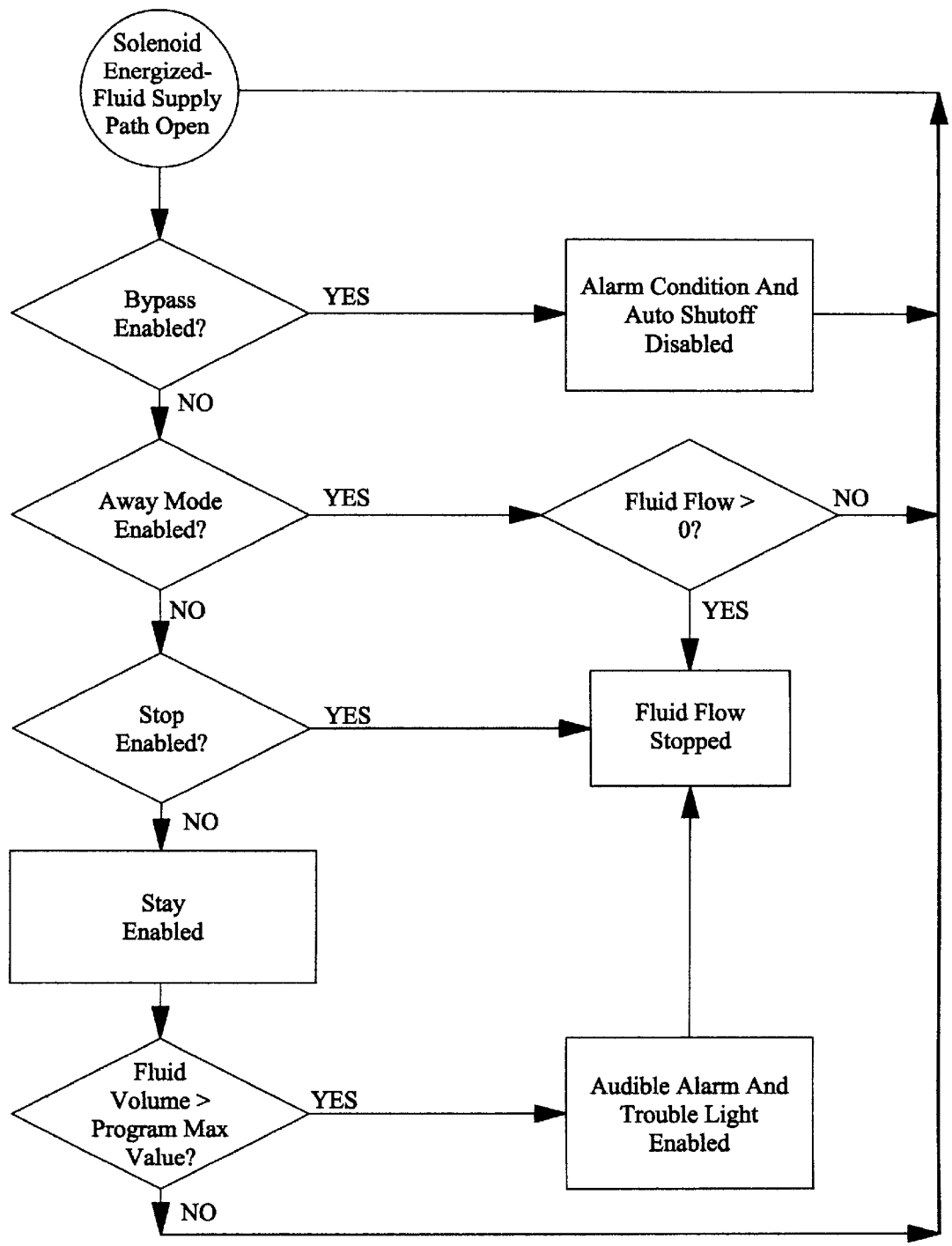
FIG. 3 is a flow chart of the preferred embodiment of the present invention for use in a single zone fluid delivery system.

Referring to the flow chart in FIG. 3, when the bypass button 34 is enabled, the central processing unit 14 is in the bypass mode. In the bypass mode, the alarm condition and automatic shut-off of fluid flow are bypassed. The bypass mode enables the user to allow a volume of fluid flow that is greater than the programmed maximum fluid flow value without disrupting fluid supply. This is particularly useful when an abnormally high amount of water usage is anticipated.

When the away button 36 is depressed, the away mode is enabled and any fluid flow volume greater than zero that is detected triggers the means for terminating the fluid flow through the fluid supply path 80. The away mode is enabled when the user anticipates being away from the facility or household for an extended period of time and when no fluid usage is anticipated. If a fluid leak occurs when the automatic fluid shut-off device 10 is in the away mode, such as with a leaky faucet or a broken water pipe, the automatic fluid shut-off device will immediately terminate fluid flow to the household or facility.

When the stop button 30 is depressed, the central processing unit 14 is in the stop mode. In the stop mode, the means for terminating fluid flow through the fluid supply path is triggered, if not already triggered by an alarm condition, thereby interrupting fluid flow through the fluid supply path 80. If an audible condition has been triggered, the stop button also stops the audible tone being emitted by the audio transducer 40 and turns off the flashing light 38.

The stay button 32 is depressed to communicate to the central processing unit 14 to enter the stay mode. The stay mode is the normal operating mode for the automatic fluid shut-off device 10 wherein fluid flow in the fluid supply path 80 is interrupted when the fluid flow volume for a flow cycle exceeds the pre-programmed maximum fluid flow value.

The trip switch for gallon tabulation 28 enables the user to reset gallon usage measurements. This allows the user to monitor fluid volume usage over any desired period of time. This is particularly useful for determining activities that require a high volume of fluid usage or for comparing actual fluid usage with billed usage from a utility company.

Referring to FIG. 4, the automatic fluid shut-off device for a multi-zone irrigation system is shown and generally referred to as 10'. In this embodiment, the fluid flow sensor 12' is structured and disposed for monitoring fluid flow through fluid supply path 80' and for measuring flow rates associated with the fluid flow. The fluid flow sensor is further structured for obtaining data correlating to the measured fluid flow rates. Means for terminating fluid flow through the fluid supply path 80 are also provided. In FIG. 4, a solenoid actuated fluid shut-off valve 16' is positioned along the fluid supply path 80 and being operable between normally open position to allow the fluid flow through the fluid supply path in a closed position to interrupt fluid flow through the fluid supply path. An alternate embodiment for means of terminating the fluid flow through the fluid supply path is shown in FIG. 7. In this embodiment, means for interrupting power to a fluid pump 76 are provided. In both embodiments of means for terminating fluid flow, the means for interrupting fluid flow through the fluid supply path are placed after the check valve 84 located in the fluid supply path.

When the automatic fluid shut-off device 10' is being used in a multi-zone system, the central processing unit 14' is optimized for use in the multi-zone system. The central processing unit communicates with the fluid flow sensor 12' and with a time clock 70, a normal component in most multi-zone fluid supply systems, and receives output data from the fluid flow sensor 12' correlating to the fluid flow rate through the fluid supply path 80'.

The central processing unit 14' is housed in a control panel 50 structured and disposed to house and to electronically communicate with the central processing unit and to facilitate communication between the central processing unit 14' and the time clock 70. The control panel 50 comprises a visual display panel 52 that displays the measured fluid flow rate for each independent zone. The control panel 50 also comprises indicator lights 54 to indicate which zone is active in the fluid supply system. The central processing unit 14' communicates with the time clock 70 to make the determination as to which zone is the active zone.

Figure 6:
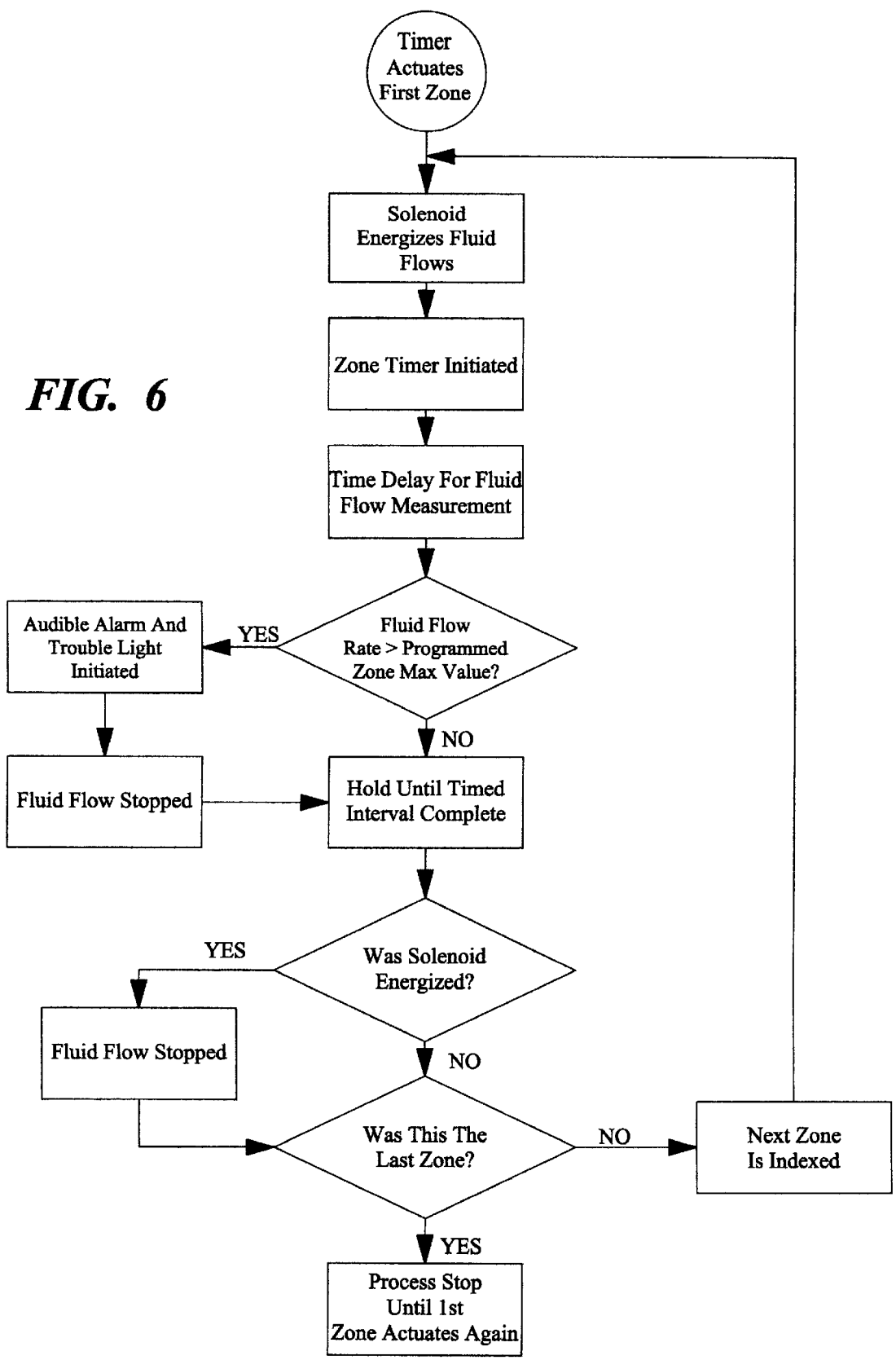
FIG. 6 is a flow chart of the preferred embodiment of the present invention for use in a multi-zone fluid delivery system.

Referring to the flow chart shown in FIG. 6, the fluid flow cycle is as follows: First, at the appropriate predetermined time programmed into the time clock 70, the time clock communicates with the central processing unit 14' signaling the central processing unit that fluid flow is being actuated and the time clock 70 energizes the solenoid actuated fluid shut-off valve to the open position to thereby facilitate fluid flow through the fluid supply path 80'. In the alternate embodiment incorporating a fluid pump rather than the solenoid actuated fluid shut-off valve, the time clock 70 applies power to the fluid pump to actuate fluid flow through the fluid supply path 82 as shown in FIG. 7. Fluid continues to flow to the first zone 74 until the predetermined stop time is reached.

The fluid flow sensor 12' begins detecting the fluid flow rate through the supply path 80' immediately. However, the central processing unit has a built-in time delay during which the central processing unit does not evaluate the fluid flow rate through the fluid supply path. This time delay allows the fluid supply path to become fully filled with fluid and for the fluid flow to reach its steady state value prior to evaluating whether the fluid flow rate is exceeding the maximum preprogrammed flow rate, thereby enabling the central processing unit 14' to ignore any initial fluid flow surges which often occur when fluid flow is first initiated. The duration of the time delay is approximately one minute.

The preprogrammed values for maximum fluid flow rate are entered into the central processing unit using the program mode. The program mode is initiated by pushing the program button 56 located on the control panel 50. To program the maximum fluid flow rate values into the central processing unit, the user may manually index the indexing valve 72 to the appropriate zone and initiate fluid flow in that zone. The red signal light 60 will begin to flash and continue to flash until the fluid flow through the system reaches steady state value. At that point and time, the red signal light will cease flashing and the green signal light 62 will illuminate, notifying the user that this steady state fluid flow rate may be entered into the central processing unit as the maximum fluid flow rate for that zone.

When the user desires to establish a new maximum fluid flow rate, based on actual fluid flow, the present fluid flow rate is entered into the active zone as the maximum fluid flow rate value for that zone by depressing the appropriate enter button 54 for that zone. There is one enter button 54 for each zone located just below the visual display panel 52 under the region of the visual display panel allocated for that zone.

After fluid flow for the first zone has reached steady state and the time delay for fluid flow measurement has timed out, the central processing unit 14' receives the measured fluid flow rate data and evaluates the fluid flow rate data with the desired maximum fluid flow rate value programmed into the central processing unit 14' for the active zone. If the measured fluid flow rate exceeds the preprogrammed desired fluid flow rate for the active zone, an alarm condition is triggered.

When the alarm condition is triggered, an audio transducer 68 structured and disposed to transmit an audible tone when the alarm condition occurs is triggered to emit an alarm tone. A trouble light 64, which is a flashing light structured and disposed to flash when the alarm condition occurs, is also triggered to flash and the central processing unit 14' communicates with the solenoid actuated shut-off valve 16' to interrupt fluid flow through the fluid supply path 80'; or in the case of a system utilizing a fluid pump, electrical power to the fluid pump 76 is interrupted. The central processing unit 14' communicates to interrupt fluid flow via the time clock 70. The audible alarm from the audio transducer 68 continues to broadcast and the trouble light 64 continues to flash until the system is reset by the user. If the system is not reset, the system will continue to operate, although the audible alarm will continue and the trouble light will continue to flash.

If the alarm condition is not triggered, fluid continues to flow in the active zone until the predetermined stop time is reached. When the stop time is reached and the solenoid activated fluid shut-off valve was energized or power was applied to the fluid pump, then fluid flow is stopped by either de-energizing the solenoid control fluid shutoff valve thereby closing the shut-off valve or interrupting power to the fluid pump, thereby stopping fluid flow. If the zone which just completed its cycle was the last zone in the system, then the process is stopped until the timer actuates the first zone again. However, if this was not the last zone in the system, then the next zone is indexed via the indexing valve 72 shown in FIG. 4 and the solenoid is energized or power is applied to the fluid pump to again begin fluid flow and the process is repeated.

What is claimed is:

1. A device for interrupting fluid flow through a fluid supply path in a fluid delivery system having a controller for selectively directing the fluid flow to a plurality of independent zones, said device comprising:

a fluid flow sensor structured and disposed for monitoring said fluid flow through said fluid supply path and for measuring fluid flow values associated with said fluid flow through each of said plurality of independent zones, said fluid flow sensor being further structured for outputting data correlating to said measured fluid flow values in each of said plurality of independent zones;

means for terminating said fluid flow through said fluid supply path;

a central processing unit communicating with said fluid flow sensor and said means for terminating said fluid flow, said central processing unit including:

means for receiving input data corresponding to each of said plurality of independent zones including data establishing at least one maximum fluid flow value for each of said plurality of independent zones;

memory means for storing said input data;

means for receiving said output data from said fluid flow sensor correlating to said measured fluid flow values;

means for detecting initiating and subsequent termination of said fluid flow through each of said plurality of independent zones to thereby define a plurality of flow cycles, wherein each of said plurality of flow cycles corresponds with one of said plurality of independent zones;

data processing means for evaluating and comparing said data correlating to said measured fluid flow values with said input data stored in said memory means in order to identify an alarm condition when one or more of said measured fluid flow values exceed said at least one maximum fluid flow value in any of said plurality of independent zones;

means for triggering actuation of said means for terminating said fluid flow upon identifying said alarm condition;

means for delaying said evaluating and comparing by said data processing means for a predetermined amount of time after initiation of each of said flow cycles;

means for selectively bypassing said evaluating and comparing by said data processing means to thereby prevent actuation of said means for triggering actuation of said means for terminating said fluid flow;

means for entering and programming said input data into said central processing unit; and indicator means for providing an alert upon said system identifying said alarm condition.

2. The device as recited in claim 1 wherein said means for terminating said fluid flow through said fluid supply path comprises a solenoid actuated fluid shut-off valve positioned along said fluid supply path and being operable between a normally open position to allow said fluid flow through said fluid supply path and to a selected one or more of said plurality of independent zones and a closed position to interrupt said fluid flow through said fluid supply path thereby preventing said fluid flow to the selected one or more of said plurality of independent zones.

3. The device as recited in claim 1 wherein said means for terminating said fluid flow through said fluid supply path comprises means for interrupting power to a fluid pump in said delivery system.

4. A fluid delivery system, comprising:

a plurality of independent zones each in fluid flow communication with a fluid supply path;

a controller between said plurality of independent zones and said fluid supply path for selectively controlling fluid flow from said fluid supply path to one or more of said plurality of independent zones according to a predetermined timed sequence;

a fluid flow sensor structured and disposed for monitoring said fluid flow through said fluid supply path and for measuring a volume of said fluid flow to each of said plurality of independent zones, said fluid flow sensor being further structured for outputting data correlating to said measured fluid flow volume for each of said plurality of independent zones;

means for terminating said fluid flow through said fluid supply path;

a central processing unit communicating said fluid flow sensor and said shut-off valve, said central processing unit comprising:

means for receiving input data corresponding to each of said plurality of independent zones including data establishing at least one maximum fluid flow volume for each of said plurality of independent zones;

memory means for storing said input data;

means for receiving said output data from said fluid flow sensor;

means for detecting initiation and subsequent termination of said fluid flow through each of said plurality of independent zones to thereby define a plurality of cycles, wherein each of said plurality of flow cycles corresponds with one of said plurality of independent zones;

data processing means for evaluating and comparing said data correlating to said measured fluid flow volume during said flow cycle with said input data stored in said memory means in order to identify an alarm condition when said measured fluid flow volume during said flow cycle exceeds said at least one maximum fluid flow volume in any of said plurality of independent zones;

means for detecting initiation of a change in said fluid flow volume prior to said termination of said fluid flow in each of said plurality of independent zones;

means for resetting said means for evaluating and comparing by said data processing means to thereby define said flow cycles for a selected time period;

means for triggering actuation of said fluid shut-off valve upon identifying said alarm condition to thereby operate said shut-off valve to said closed position;

means for selectively bypassing said evaluating and comparing by said data processing means to thereby enable selective control of said means for terminating said fluid flow through said fluid supply path or to actuate said means for terminating said fluid flow upon said fluid flow sensor measuring said fluid flow volume being greater than zero;

means for entering and programming said input data into said central processing unit;

indicator means for providing an alert upon said system identifying said alarm condition;

means for tabulating said fluid flow volume for a selected time period;

means for resetting said means for tabulating said fluid flow volume;

means for outputting data to display results of said tabulating; and means for outputting data to display said output data from said fluid flow sensor.

5. The device as recited in claim 4 wherein said means for terminating said fluid flow through said fluid supply path comprises a solenoid actuated fluid shutoff valve positioned along said fluid supply path and being operable between a normally open position to allow said fluid flow through said fluid supply path and to a selected one or more of said plurality of independent zones and a closed position to interrupt said fluid flow through said fluid supply path thereby preventing said fluid flow to the selected one or more of said plurality of independent zones.

6. The device as recited in claim 4 wherein said means for terminating said fluid flow through said fluid supply path comprises means for interrupting power to a fluid pump in said delivery system.

7. The device as recited in claim 4 wherein said means for entering and programming said input data into said central processing unit comprises a control panel structured and disposed to house and electronically communicate with said central processing unit, said control panel comprising:

a visual display;

an audio transducer structured and disposed to transmit an audible tone when said alarm condition is triggered;

a flashing light structured and disposed to flash when said alarm condition is triggered;

means for selecting and entering said input data;

means for communicating with said central processing unit to activate said means for selectively bypassing said evaluating and comparing by said data processing means; and means for communicating with said central processing unit to activate said means for resetting said tabulating said fluid flow volume.

8. The device as recited in claim 7 wherein said means for selecting and entering said input data comprises:

button means for selecting said at least one maximum fluid flow volume;

means for displaying said at least one maximum fluid flow volume on said visual display panel; and button means for entering said at least one maximum fluid flow volume being displayed on said visual display panel into said central processing unit.

9. The device as recited in claim 7 wherein said means for communicating with said central processing unit to activate said means for selectively bypassing said evaluating and comparing by said data processing means comprises button means.

10. A device for interrupting fluid flow through a fluid supply path in a fluid delivery system having a controller for selectively directing the fluid flow to a plurality of independent zones, said device comprising:

a fluid flow sensor structured and disposed for monitoring said fluid flow through said fluid supply path and for measuring fluid flow values associated with said fluid flow through each of said plurality of independent zones, said fluid flow sensor being further structured for outputting data correlating to said measured fluid flow rates in each of said plurality of independent zones;

means for terminating said fluid flow through said fluid supply path;

a central processing unit communicating with said fluid flow sensor and said means for terminating said fluid flow, said central processing unit including:

means for receiving input data corresponding to each of said plurality of independent zones including data establishing at least one maximum fluid flow rate for each of said plurality of independent zones;

memory means for storing said input data;

means for receiving said output data from said fluid flow sensor correlating to said measured fluid flow rates;

means for detecting initiating and subsequent termination of said fluid flow through each of said plurality of independent zones to thereby define a plurality of flow cycles, wherein each of said plurality of flow cycles corresponds with one of said plurality of independent zones;

data processing means for evaluating and comparing said data correlating to said measured fluid flow rates with said input data stored in said memory means in order to identify an alarm condition when one or more of said measured fluid flow rates exceed said at least one maximum fluid flow rate in any of said plurality of independent zones;

means for triggering actuation of said means for terminating said fluid flow upon identifying said alarm condition;

means for delaying said evaluating and comparing by said data processing means for a predetermined amount of time after initiation of each of said flow cycles;

means for selectively bypassing said evaluating and comparing by said data processing means to thereby prevent actuation of said means for triggering actuation of said means for terminating said fluid flow;

means for entering and programming said input data into said central processing unit;

indicator means for providing an alert upon said system identifying said alarm condition;

a time clock, said time clock communicating with said central processing unit and being structured and disposed for determining when each of said plurality of flow cycles begins, and said time clock further being structured and disposed for determining the duration of each of said plurality of flow cycles; and said means for triggering actuation of said means for terminating said fluid flow being structured and disposed to reset after completion of each of said plurality of fluid flow cycles wherein said alarm condition is identified, thereby enabling said fluid flow through said fluid supply path and to another one of said plurality of independent zones upon the next of said plurality of fluid flow cycles being initiated.

11. The device as recited in claim 10 wherein said means for terminating said fluid flow through said fluid supply path comprises a solenoid actuated fluid shut-off valve positioned along said fluid supply path and being operable between a normally open position to allow said fluid flow through said fluid supply path and a closed position to interrupt said fluid flow through said fluid supply path.

12. The device as recited in claim 10 wherein said means for terminating said fluid flow through said fluid supply path comprises means for interrupting power to a fluid pump in said delivery system.

13. The device as recited in claim 12 wherein said means for entering and programming said input data into said central processing unit comprises a control panel structured and disposed to house and electronically communicate with said central processing unit, said control panel comprising:

a visual display panel that displays the status and flow meter reading of each of said plurality of independent zones;

an audio transducer structured and disposed to transmit an audible tone when said alarm condition is triggered;

a flashing light structured and disposed to flash when said alarm condition is triggered;

a flashing light structured and disposed to flash when said fluid flow rate is not constant;

a light structured and disposed to illuminate when said fluid flow rate is constant;

means for setting said device for interrupting fluid flow into programming mode;

means for selecting and entering said input data; and means for setting said device for interrupting fluid flow into automatic mode.

14. The device as recited in claim 13 wherein said means for selectively bypassing said evaluating and comparing by said data processing means comprise button means.

\* \* \* \* \*